(12) United States Patent
Kc et al.

(10) Patent No.: US 10,977,798 B2
(45) Date of Patent: Apr. 13, 2021

(54) DIRECT THIN BOUNDARY PREDICTION

(71) Applicant: Apple Inc., Cupertino, CA (US)

(72) Inventors: Amit Kumar Kc, Los Angeles, CA (US); Daniel Ulbricht, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 76 days.

(21) Appl. No.: 16/545,158

(22) Filed: Aug. 20, 2019

(65) Prior Publication Data

US 2020/0065973 A1    Feb. 27, 2020

Related U.S. Application Data

(60) Provisional application No. 62/722,423, filed on Aug. 24, 2018.

(51) Int. Cl.
*G06T 7/13* (2017.01)
*G06N 3/08* (2006.01)

(52) U.S. Cl.
CPC .................. *G06T 7/13* (2017.01); *G06N 3/08* (2013.01); *G06T 2207/20081* (2013.01)

(58) Field of Classification Search
CPC ............. G06T 7/13; G06T 2207/20081; G06T 2207/20084; G06N 3/08; G06N 3/084
See application file for complete search history.

(56) References Cited

U.S. PATENT DOCUMENTS 8,031,919 B2    10/2011    Eskildsen et al.

FOREIGN PATENT DOCUMENTS

CN    103886589    6/2014
CN    107610140    1/2018

OTHER PUBLICATIONS

Tajbakhsh, Nima, Shin, Jae Y., Gurudu, Suryakanth R., Hurst, R. Todd, Kendall, Christopher B. Gotway, Michael B. and Liang Jianming, "Convolutional Neural Networks for Medical Image Analysis: Full Training or Fine Tuning?", IEEE Transactions on Medical Imaging. 35(5):pp. 1-17; Jun. 2, 2017.
Wang, Ruohui, "Edge Detection Using Convolutional Neural Network", Department of Information Engineering, The Chinese University of Hong Kong, Hong Kong, China, pp. 12-20, 2016.

*Primary Examiner* — Christopher Wait
(74) *Attorney, Agent, or Firm* — Thompson Hine LLP

(57) ABSTRACT

In some implementations a neural network is trained to perform to directly predict thin boundaries of objects in images based on image characteristics. A neural network can be trained to predict thin boundaries of objects without requiring subsequent computations to reduce the thickness of the boundary prediction. Instead, the network is trained to make the predicted boundaries thin by effectively suppressing non-maximum values in normal directions along what might otherwise be a thick predicted boundary. To do so, the neural network can be trained to determine normal directions and suppress non-maximum values based on those determined normal directions.

20 Claims, 8 Drawing Sheets

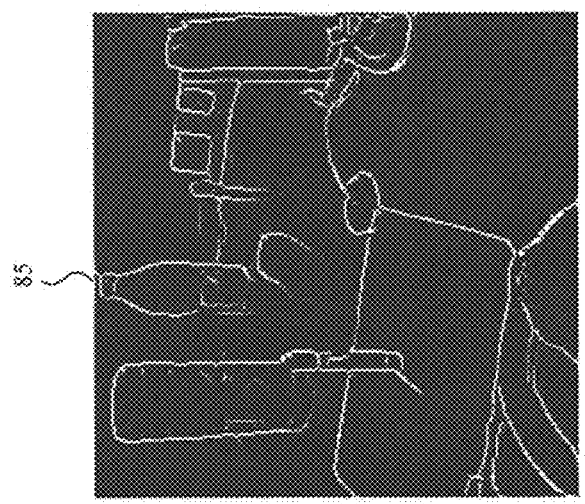
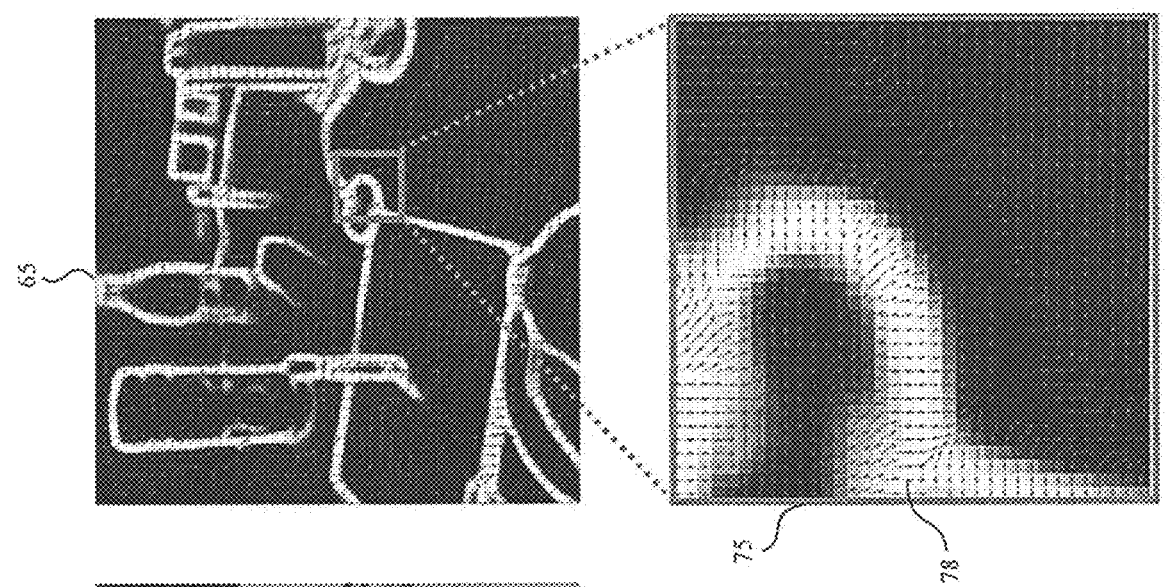
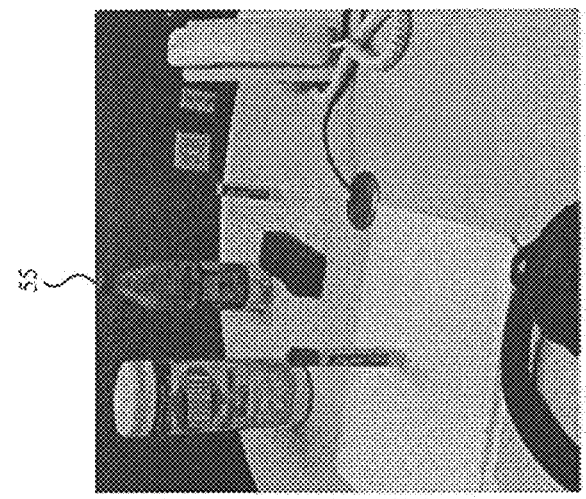
FIG. 3

FIG. 7 — Ground Truth (Labeled Thin Boundary)

FIG. 8 — Boundary Prediction and Poor Normal Prediction During Training

FIG. 9 — Estimated Thin Boundary after Suppression using Poorly Predicted Normal Directions FIG. 10 — Relatively Larger Loss For Boundary Inaccuracy FIG. 11 — Boundary Prediction and Better Normal Prediction During Training FIG. 12 — Estimated Thin Boundary after Suppression using Better Predicted Normal Directions FIG. 13 — Relatively Smaller Loss For Boundary Inaccuracy

DIRECT THIN BOUNDARY PREDICTION

CROSS-REFERENCE TO RELATED APPLICATION

This application claims the benefit of U.S. Provisional Application Ser. No. 62/722,423 filed Aug. 24, 2018, which is incorporated herein in its entirety.

TECHNICAL FIELD

The present disclosure generally relates to image interpretation, and in particular, to systems, methods, and devices for predicting boundaries between objects in images.

BACKGROUND

Various computer-implemented techniques are used to predict where the boundaries between objects depicted in still or video images occur. Some techniques for predicting boundaries utilize machine learning models, e.g., techniques that use encoder-decoder networks trained using examples in which boundaries have been manually identified. These machine learning-based techniques generally predict boundaries that are thicker than desired for many use cases. Techniques for thinning the thick boundaries identified by these machine learning-based techniques generally require post processing of neural network outputs. The post processing involves computations that are expensive in terms of processing, resource requirements, and time.

SUMMARY

In some implementations a neural network is trained to directly predict thin boundaries between objects in images based on image characteristics. A neural network can be trained to predict thin boundaries of objects without requiring post processing of neural network outputs to reduce the thickness of the boundary prediction. Instead, the neural network is trained to make the predicted boundaries thin by effectively suppressing non-maximum values in normal directions along what might otherwise be a thick predicted boundary. To do so, the neural network can be trained to determine normal directions and suppress non-maximum values based on those determined normal directions.

In some implementations, a neural network is trained using a loss function that penalizes boundary inaccuracies, e.g., deviations from ground truth thin-boundary data. The neural network can include a first neural network component that outputs thick boundary predictions and normal predictions. The neural network can also include warping and non-maximum suppression components that use the thick boundary predictions and normal predictions to predict a thin boundary. These thin boundary predictions are compared with the ground truth thin boundary data and the calculated error/loss is used to adjust/train the neural network. In this way, the network is trained to make both better thin boundary predictions and better normal predictions. These predictions are related. The normal predictions are used to suppress the non-maximums which are used to make the thin boundary predictions. Better normal predictions result in thinner boundary predictions that better match the ground truth thin boundary data—less error/loss. In this way, the neural network is trained to make good normal predictions and consequently good thin boundary predictions, without necessarily using ground truth labeled normal data. In some implementations, a neural network is trained to make accurate thin boundary predictions using accurate normal direction predictions using only thin boundary ground truth data (e.g., without needing labeled normal ground truth data).

In some implementations, an electronic device trains a neural network and integrates the trained neural network into an application. The device obtains training inputs identifying boundaries in ground truth image data. For example, this can involve obtaining a set of images having manually labeled boundaries. The device trains a neural network to determine boundaries in images using the training inputs and a loss function. Specifically, the neural network is trained to determine the boundaries, determine normal directions, and limit boundary thickness based on the normal directions. For example, limiting boundary thickness may involve suppressing pixels (e.g., excluding them from the boundaries) that are not the maximums of the pixels on either side in predicted normal directions. After training, the device integrates the neural network into an application stored on a non-transitory computer-readable medium, for example, for use by end users to identify boundaries in their own unlabeled images.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3 is a block diagram illustrating an image, thick boundaries of the image including normal directions, and thin boundaries for the image.

FIG. 7 is a block diagram illustrating exemplary ground truth data for a portion of an exemplary image in which a boundary has been labeled.

FIG. 8 is a block diagram illustrating an exemplary thick boundary prediction and normal prediction for the image corresponding to the ground truth data of FIG. 7.

FIG. 9 is a block diagram illustrating an estimated thin boundary after suppressing using poorly predicted normal directions.

FIG. 10 is a block diagram illustrating an exemplary loss for the boundary inaccuracy of the thin boundary prediction of FIG. 9.

FIG. 11 is a block diagram illustrating an exemplary thick boundary prediction and normal for the image corresponding to the ground truth data of FIG. 7.

FIG. 12 is a block diagram illustrating an estimated thin boundary after suppressing using better predicted normal directions.

FIG. 13 is a block diagram illustrating an exemplary loss for the boundary inaccuracy of the thin boundary prediction of FIG. 12.

Figure 1:
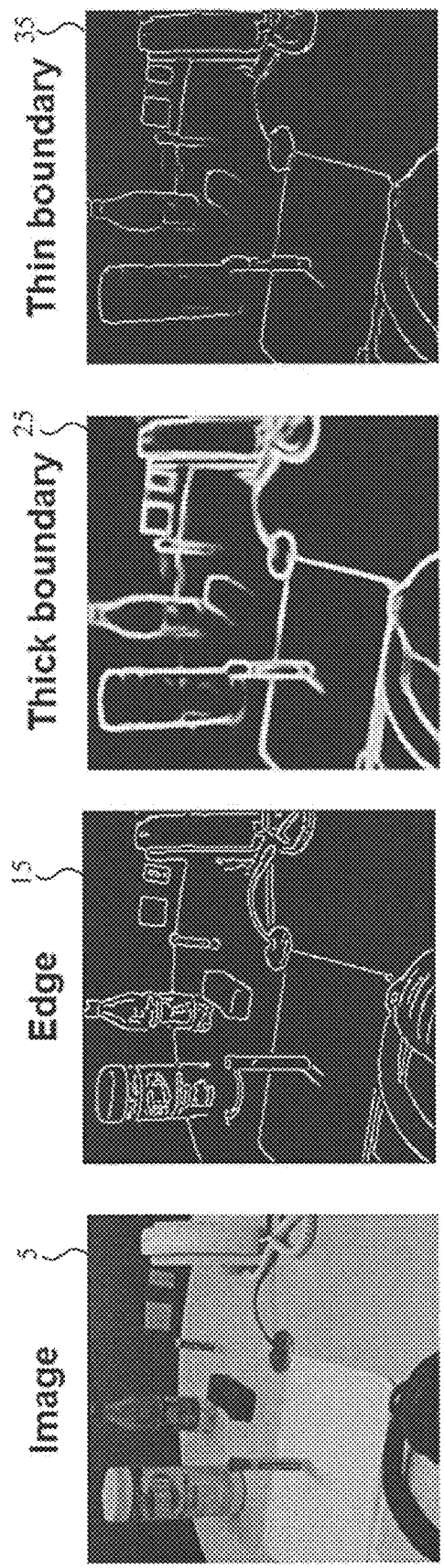
FIG. 1 is a block diagram illustrating an example image, edges within the image, thick boundaries within the image, and thin boundaries within the image.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 is a block diagram illustrating an example image 5, a depiction 15 of edges within the image 5, a depiction 25 of thick boundaries within the image 5, and a depiction 35 of thin boundaries within the image 5. Various techniques can be used to automatically identify the edges within an image. For example, a device can analyze the pixels of image 5 to identify differences in intensity, color, or other characteristics between adjacent pixels and these differences can be used to identify edges. Existing pixel-difference-based edge detection techniques predict edge locations with relative accuracy and, since the edges are determined based on pixel differences, the predicted edges may be relatively thin.

In contrast to existing edge detection techniques, automatic techniques for identifying boundaries generally produce thick boundaries, such as are illustrated by depiction 25. The term "boundaries," as used herein, refers to the edges of an image that separate objects from one another. Thus, the edges that are within individual objects are not boundaries. Some existing techniques use neural networks to predict boundaries, but such boundaries are generally too thick and imprecise for many use cases. Many use cases, such as object detection, would benefit from thinner boundaries such as are illustrated in depiction 35.

Figure 2:
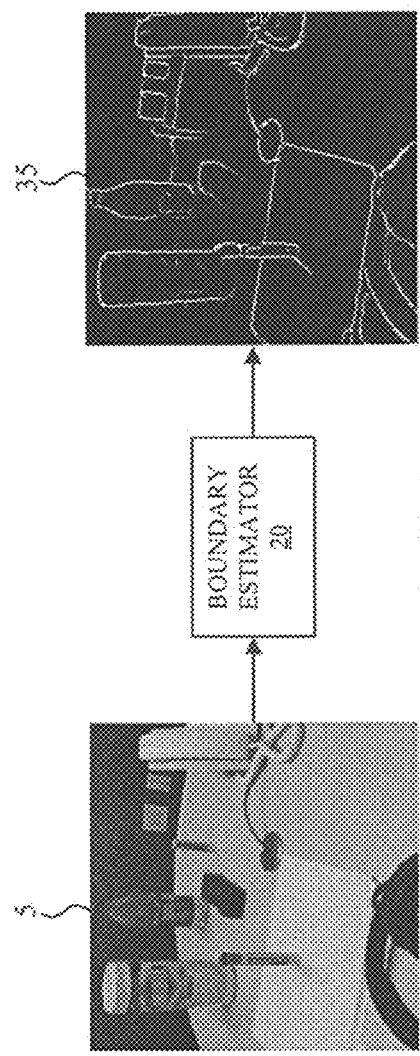
FIG. 2 is a block diagram illustrating a boundary estimator determining a thin boundary for an inputted image in accordance with some implementations.

FIG. 2 is a block diagram illustrating a boundary estimator 20 for determining a thin boundary for an inputted image in accordance with some implementations. In this example, the boundary estimator 20 receives the image 5 and produces an output identifying thin boundaries, e.g., depiction 35. In this example, the outputted thin boundary prediction 35 has the form of an image (e.g., depiction 35) in which pixel intensity corresponds to likelihood that each pixel is part of the boundary. In this example, the low intensity pixels (e.g., the dark pixels) are unlikely to be part of the boundaries while the high intensity pixels (e.g., the white pixels) are more likely to be part of the boundaries. The depiction 35 illustrates a thin boundary in which the pixels that are likely to be part of the boundaries form relatively thin lines, e.g., the thickness of the lines is equal or less than a threshold (e.g., 1 pixel, 2 pixels, 3 pixels) in directions normal to the lines. In contrast, the pixels that are part of the thick boundaries illustrated in depiction 25 of FIG. 1 form lines that are thicker than the threshold in many places.

FIG. 3 is a block diagram illustrating an image 55, a depiction 65 of thick boundaries of the image 55 including normal directions, and a depiction 85 of thin boundaries for the image 55. Depiction 75 is a close up view of a portion of the depiction 65 including arrows (e.g., arrow 78) illustrating the normal directions determined for the individual pixels. Normal directions for the high intensity pixels (e.g., the white pixels) that are likely to be part of the boundaries can be used to thin the thick boundaries of depiction 65 to produce the relatively thin boundaries of depiction 85. For example, pixels along each of the normal that are not maximum can be suppressed (e.g., via a non-maximum suppression technique) to yield thinner boundaries. Some implementations disclosed herein train neural networks to make thin boundary predictions by training the neural networks to accurately predict normal directions and to make the boundary predictions thin based on those predicted normal directions.

Figure 4:
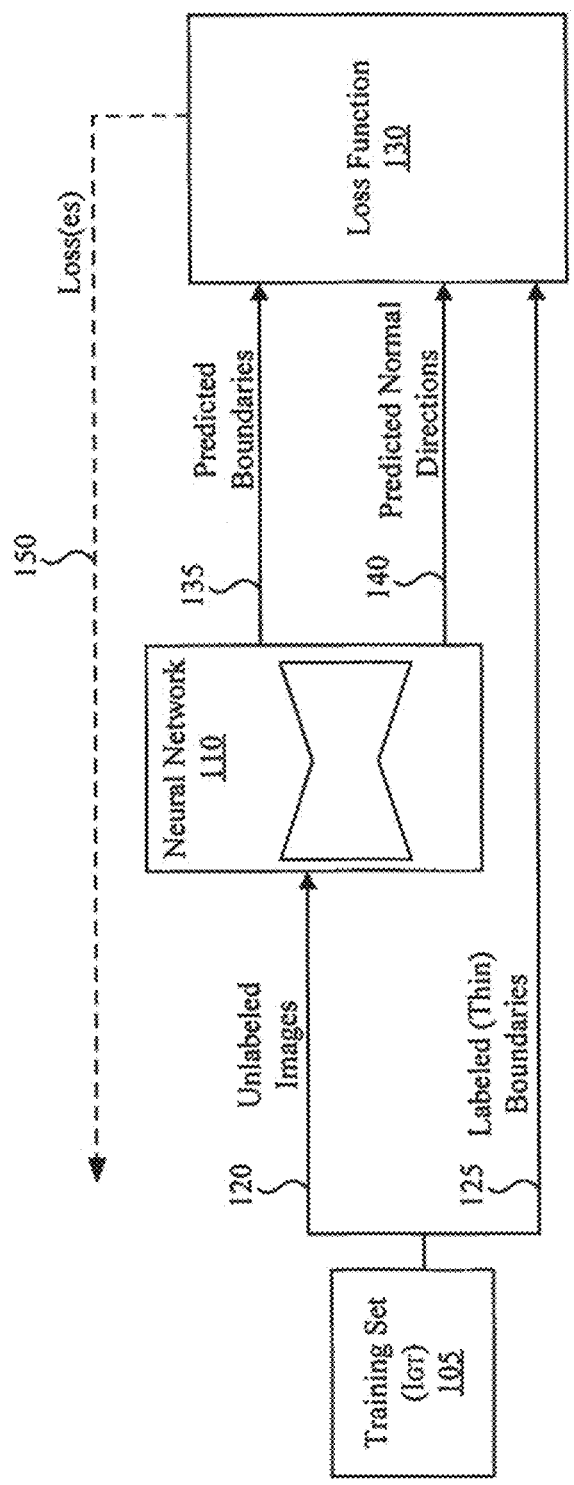
FIG. 4 is a block diagram illustrating training a neural network for direct thin boundary prediction.

FIG. 4 is a block diagram illustrating the training of a neural network 110 for direct thin boundary prediction. In this example, a training set ($I_{Ground\ Truth}$ or $I_{GT}$) 105 is obtained. For example, the training set 105 may include a set of images in which the boundaries of the objects in the images are labeled. These images may have been labeled automatically or manually, for example, by a person manually drawing the boundaries on the images. The training set 105 can include both the unlabeled images 120 and the labeled images 125.

In the example of FIG. 4, during training the unlabeled images 120 are input into neural network 110 to produce outputs: predicted boundaries 135 and predicted normal directions 140. The neural network 110 in this example is an encoder decoder network, but can have other forms in alternative implementations. The loss function 130 uses the labeled thin boundaries 125 of the training set 105 to determine the loss. The loss function 130 is configured to use the predicted boundaries 135 and predicted normal directions 140 to determine one or more losses 150 that are used to adjust the neural network 110 to better satisfy its objectives. For example, at each of multiple training iterations, the weights of the neural network 110 may be adjusted via a back propagation technique according to the one or more losses 150.

Figure 5:
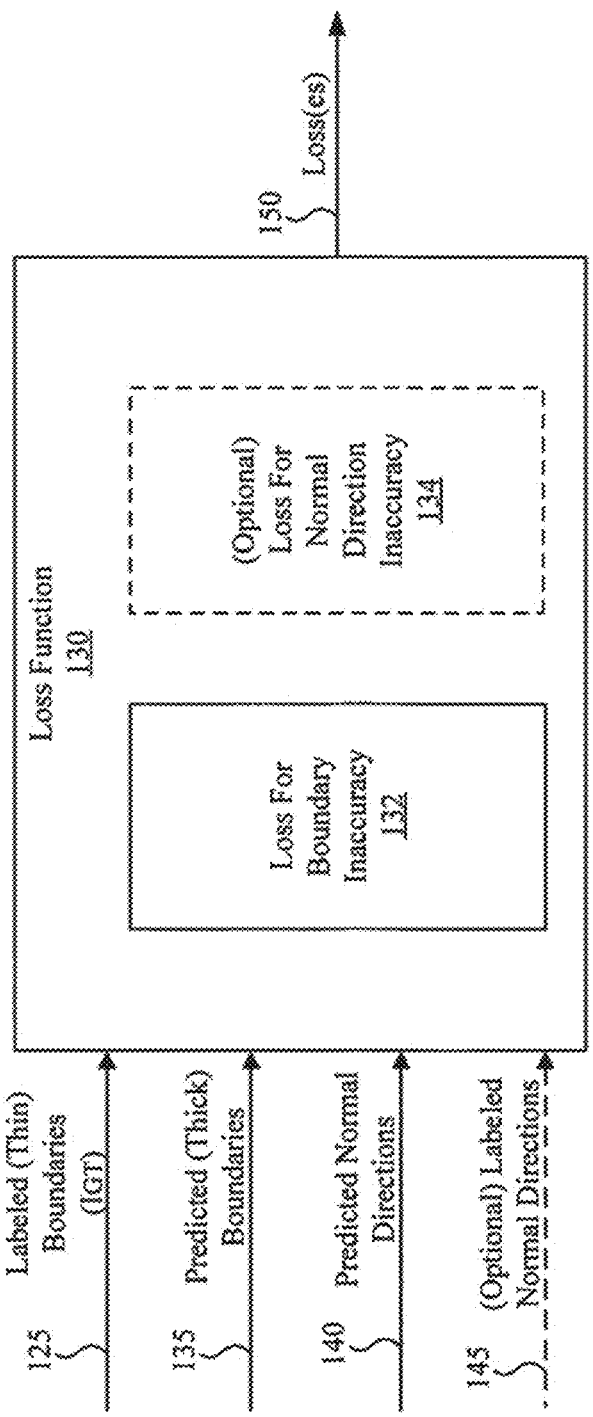
FIG. 5 is a block diagram illustrating an exemplary loss function for the neural network of FIG. 4.

FIG. 5 is a block diagram illustrating an exemplary loss function for the neural network of FIG. 4. The loss function 130 determines the one or more losses 150 based on the labeled (thin) boundaries 125, predicted (thick) boundaries 135, the predicted normal directions 140, and, optionally, labeled normal directions 145. The loss function 130 includes two loss determinations that determine: a loss for boundary inaccuracy 132 and an optional loss for normal direction inaccuracy 134. Various comparisons can be used to determine these losses and the losses can be combined with one another in various ways. The loss for boundary inaccuracy 132 can involve comparing the predicted boundaries 135 with the labeled boundaries 125 to determine and quantify boundary inaccuracy.

In some implementations, the loss for normal direction inaccuracy 134 is determined based on the labeled normal directions 145 in at least some of the images of training set 105, e.g., by comparing the predicted normal directions 140 to the labeled normal directions 145 to determine and quantify normal direction inaccuracy.

However, in other implementations little or no labeled normal direction data is available. In such implementations, the loss for normal direction inaccuracy can be implicitly assessed by identifying another condition that is correlated with inaccuracy in the predicted normal directions 140. One exemplary condition is whether a pixel on a boundary is the maximum (e.g., has the max likelihood of being part of a boundary) compared to its neighbors on one or both sides in a predicted normal direction. This condition is most likely to be true when the predicted normal is accurate (e.g., perpendicular) and thus enforcing the condition also enforces (e.g., trains the neural network) to accurately predict the normal directions. Another exemplary condition for indirectly enforcing accurate normal direction predictions minimizes a number of pixels on either side of a pixel in a predicted normal direction that have intensity values above a threshold (e.g., minimizing the number of pixels on either side in the normal direction that are also likely to be part of a boundary). In other implementations, different or additional losses are used to penalize normal direction inaccuracy.

Figure 6:
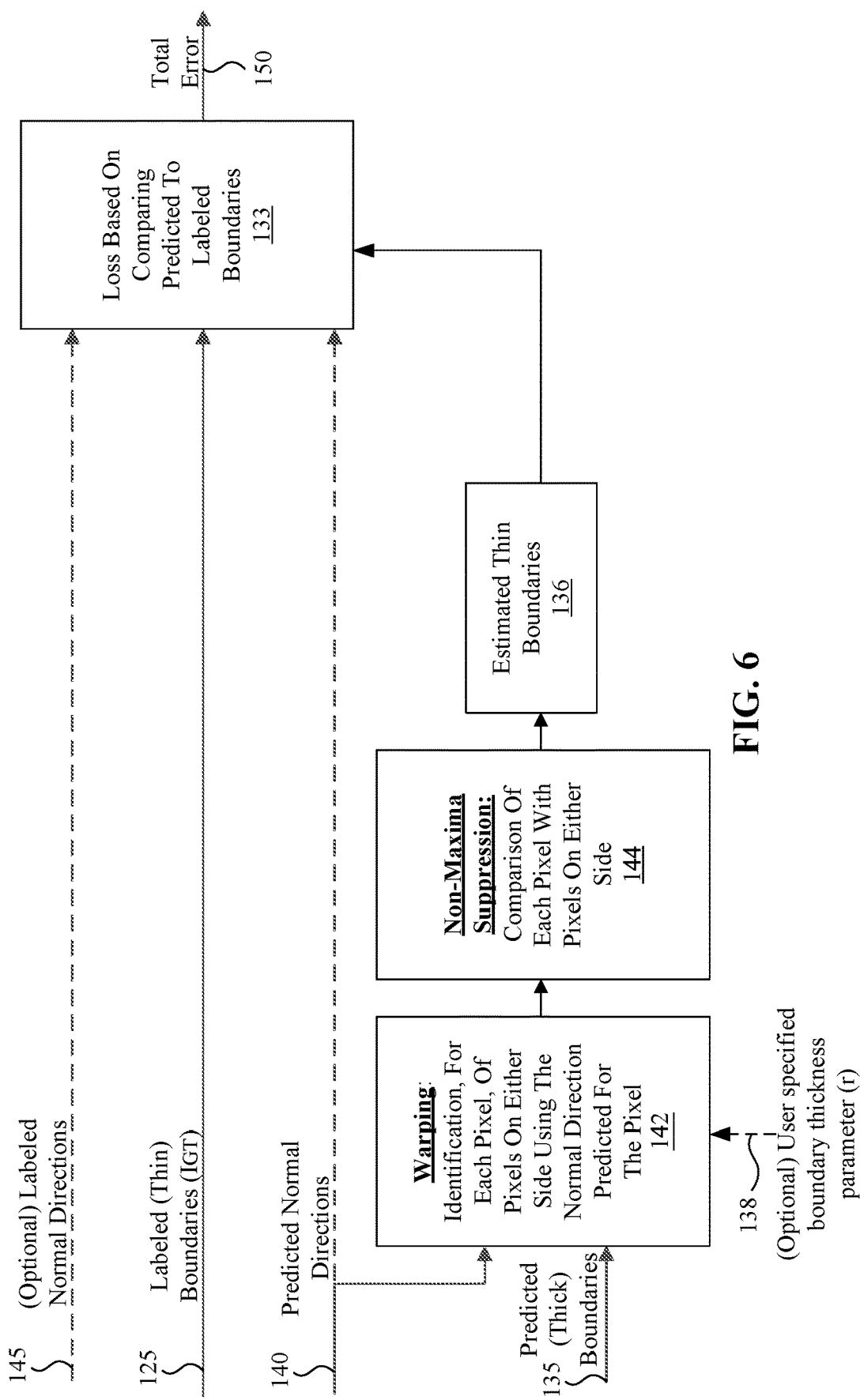
FIG. 6 is a block diagram illustrating another exemplary loss function for the neural network of FIG. 4.

FIG. 6 is a block diagram illustrating another implementation of the exemplary loss function 130 for the neural network of FIG. 4. In this example, the loss function 130 includes a loss based on comparing predicted boundaries to labeled boundaries 133. In this example, estimated thin boundaries 136 are determined using predicted thick boundaries and warping and non-maxima suppression techniques. The estimated thin boundaries 136 are compared with the labeled (thin) boundaries 125 to determine the loss based on comparing predicted boundaries to labeled boundaries 133, which is output as the total error 150. The estimated (thin) boundaries 136 and the labeled (thin) boundaries 125 can each have the form of images (e.g., depiction 35) in which each pixel's intensity corresponds to the likelihood that that pixel is part of a boundary. Such images can be compared to one another to determine the loss e.g., the pixel at position 1,1 in an image of the estimated thin boundaries 136 can be compared with the pixel at position 1,1 in a corresponding image of the labeled boundaries 125, etc.). The total differences of all pixels can be summed, averaged, or otherwise combined to determine a total error 150. The total error 150 is used to train the neural network.

An exemplary process for determining the estimated thin boundaries 136 is illustrated in FIG. 6. In this example, the predicted thick boundaries 135 and predicted normal directions are input to a warping block 142. An optional user-specified boundary thickness parameter (r) 138 may also be input. At warping block 142, for each pixel, pixels on either side of the pixel are identified using the normal direction predicted for the pixel. The pixels on either side may be selected based on the user-specified boundary thickness parameter (r) 138. For example, if the value of r is one, the pixels adjacent to the pixel on either side of the pixel may be identified, while if the value of the user-specified boundary thickness parameter (r) 138 is 2, pixels two away from the pixel may be identified. In some implementations, more than 1 pixel (e.g., 2, 3, 4 etc.) on either side of the pixel are identified.

For each pixel, the identified pixels on either of its sides in the predicted normal direction are analyzed at non-maxima suppression block 144. At non-maxima suppression block 144, a comparison of each pixel with the identified pixels on either side is performed. For example, this comparison may compare pixel intensity values corresponding to the likelihood that each pixel is part of the boundary (e.g., a pixel having a high likelihood of being on a boundary will have a greater intensity than a pixel having a lower likelihood of being on a boundary). Such a comparison may compare whether a given pixel on a predicted boundary is greater than the pixels on either sides of it in the normal direction.

The non-maxima suppression block 144 may assess each pixel of a predicted thick boundary, e.g., each pixel having an intensity value/likelihood above zero or another appropriate threshold value, and suppress those that are not maximums in the comparison. Thus, if a pixel is compared with the identified pixels on either side of it in the predicted normal direction and it does not have the maximum intensity/likelihood of those other pixels, it will be eliminated as part of the boundary. The pixel's intensity value/likelihood may be reduced to zero, another predetermined value, or by a predetermined amount or percentage. In this way the thickness of the boundary is reduced by non-maxima suppression.

In some implementations, the comparison of pixels on either side involves comparing a pixel with its immediate neighbor on either side (e.g., r=1). In other implementations, the parameters of the comparison can be adjusted. In some implementations, the comparison uses pixels that are 2 away (e.g., r=2), 3 away (e.g., r=3), etc. Using a larger value for r can result in boundaries having a desired thickness. Greater values of r will result in the neural network being trained to identify respectively thicker boundaries, (e.g., r=1) may generally encourage boundaries 1 pixel thick, r=2 may generally encourage boundaries 3 pixels thick, r=5 may generally encourage boundaries 5 pixels thick, etc.

The non-maxima suppression block 144 outputs estimated thin boundaries 136, which can be compared with the labeled thin boundaries 125 to determine the loss based on comparing the predicted to the labeled boundaries 133. The loss based on comparing predicted to labeled boundaries 133 may ultimately be used to train the network to predict better normal predictions, e.g., normal predictions that are perpendicular to the boundary rather than parallel to it. For example, if the neural network has predicted a normal direction for a pixel that is parallel rather than perpendicular to the boundary, the non-maxima suppression will be less effective, the boundaries will be thicker, and, consequently, the loss/penalty will generally be greater. In other words, given a poor normal, the result of the non-maxima suppression block 144 will not suppress the thickness of the boundary sufficiently and the estimated thin boundary 136 would likely differ from the labeled thin boundary 125, resulting in a significant loss based on comparing predicted to labeled boundaries. As the network learns to predict better normal directions 140, the estimated thin boundaries 136 will align better with the labeled (thin) boundaries 125.

In the example of FIG. 6, a single loss, total error 150, penalizes the neural network 110 for predicting inaccurate normal and for predicting thick boundaries. Such a condition enforces the learning of accurate normal directions even in the absence of training data having labeled normal directions. However, as noted in FIG. 6, in some implementations labeled normal directions 145 can be compared with the predicted normal directions as part of the total error 150. In one such implementation, labeled normal directions 145 are automatically generated based on labeled thin boundaries 125, for example, using an algorithm that estimates perpendicular lines along the labeled thin boundaries 125.

FIGS. 7-13 illustrate how an exemplary loss function 130 is used to train the neural network 110 to predict thin boundaries using accurate normal direction predictions. FIG. 7 is a block diagram illustrating exemplary ground truth data for a portion of an exemplary image in which a thin boundary has been labeled. In this example, the ground truth data is identified on a 10×10 grid of pixels in which pixel intensity is represented by a number and corresponds to whether each pixel is on the boundary or not. A value of "5" represents a pixel being on a boundary and a "-" corresponds to zero and that the pixel is not on a boundary.

FIG. 8 is a block diagram illustrating an exemplary thick boundary prediction and normal prediction (for one pixel) for the image corresponding to the ground truth data of FIG. 7. In this example, a corresponding 10×10 grid of pixels is used and the values are intensities (which could be depicted graphically) corresponding to likelihoods that each pixel is part of the boundary. In this example, various pixels that are separate from the boundary are inaccurately identified as boundary pixels. In addition, in this example, the boundaries are inaccurate because they are too thick, pixels outside of the actual boundaries have been inaccurately identified as part of the boundaries. For example, the boundary in the region 205 appears to be 3 pixels thick, having two extra pixels that are inaccurately identified as part of the boundary. The example of FIG. 8 illustrates a grid that could be a portion of a thick boundary prediction output of a neural network. The exemplary normal prediction 225 for the pixel 215 is relatively parallel to the boundary and thus represents an inaccurate normal boundary prediction that could also have been an output of a neural network.

FIG. 9 is a block diagram illustrating an estimated thin boundary after suppressing maxima using poorly predicted normal directions, such as poorly predicted normal direction 225 of FIG. 8. FIG. 10 is a block diagram illustrating an exemplary loss for the thin boundary inaccuracy of the thin boundary prediction of FIG. 9. In this example, a corresponding 10×10 grid of pixels is used and the values are the intensity differences between the thin boundary predictions during training (FIG. 9) and the ground truth (FIG. 7). These values can be summed, averaged, or otherwise combined (along with similar values for the other pixels of the image not shown) to determine a total loss for boundary inaccuracy.

FIG. 11 is a block diagram illustrating a boundary prediction and a better normal prediction for the image corresponding to the ground truth data of FIG. 7. The predicted normal 255 of FIG. 11 is more accurate than the predicted normal 225 of FIG. 8. FIG. 12 is a block diagram illustrating an estimated thin boundary after suppressing using better predicted normal directions, such as better predicted normal direction 255 of FIG. 11. FIG. 13 is a block diagram illustrating an exemplary loss for the thin boundary inaccuracy of the thin boundary prediction of FIG. 12. In this example, a corresponding 10×10 grid of pixels is used and the values are the intensity differences between boundary predictions during a later iteration/stage of training (FIG. 12) and the ground truth (FIG. 7). These values can be summed, averaged, or otherwise combined (along with similar values for the other pixels of the image not shown) to determine a total loss for boundary inaccuracy. The combined value, which is the loss/penalty, provides a numerical assessment of the boundary inaccuracy. The combined value/loss/penalty of FIG. 13 is less than that of FIG. 10. During training, these losses will encourage the network to identify better, more accurate, and thinner normal and boundaries.

Figure 14:
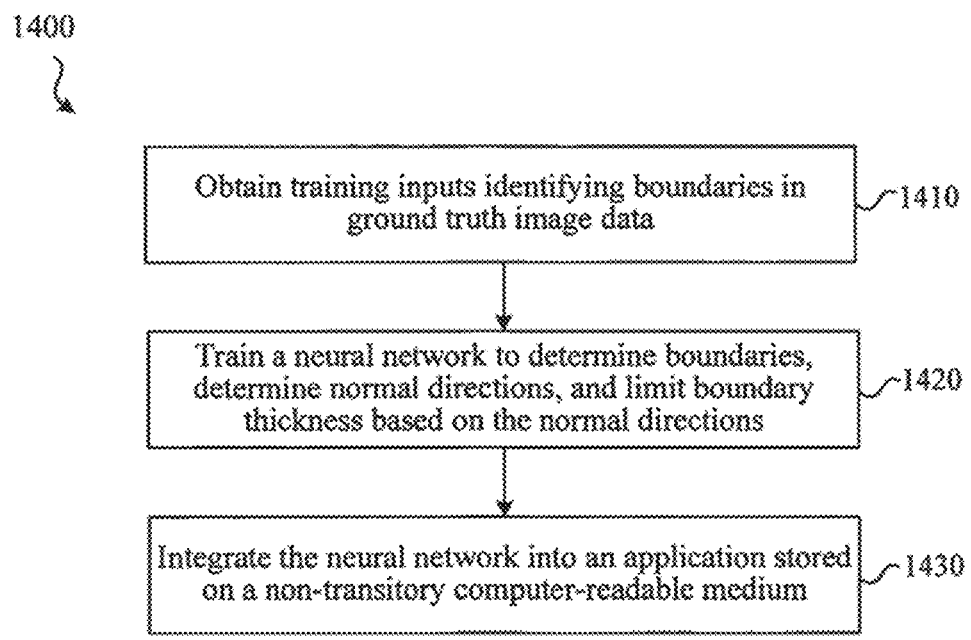
FIG. 14 is a flowchart representation of a method of using a neural network to directly predict thin boundaries in accordance with some implementations.

FIG. 14 is a flowchart representation of a method of using a neural network to directly predict thin boundaries in accordance with some implementations. In various implementations, example method 1400 is performed by processing logic, including hardware, firmware, software, or a combination thereof. In some implementations, example method 1400 is performed by a processor executing code stored in a non-transitory computer-readable medium (e.g., a memory). In some implementations, example method 1400 is performed on a portable electronic device (e.g., laptop, tablet, smartphone, head-mounted display (HMD)).

At block 1410, the method 1400 obtains training inputs identifying boundaries in ground truth image data. In some implementations, the training inputs are images having manually identified boundaries between objects in the images. In some implementations only boundaries are labeled in the training inputs, while in other implementations both boundaries and normal directions are labeled. A training input can be a pair of images, e.g., image 5 paired with image 35 of FIG. 1 or image 55 paired with image 85 of FIG. 3. In some implementations, the training inputs comprise images having boundaries added directly into the image, for example, in a particular color or on a particular layer of the image. Training set 105 of FIG. 4 is an example of training inputs. The grid of FIG. 7 is another example of a portion of a training input.

At block 1420, the method 1400 trains a neural network to determine boundaries, determine normal directions, and limit boundary thickness based on the normal directions. This training can involve one or more of the training techniques illustrated in FIGS. 4-13. In some implementations, the training uses a loss function that penalizes boundary inaccuracy, for example, by penalizing deviation from a boundary identified in the ground truth image data. The deviation may correspond to inaccuracy in limiting of boundary thickness, e.g., inaccuracy from using an inaccurate normal in a non-maxima suppression technique. Accordingly, the inaccuracy may correspond to inaccuracy in normal predictions. In some implementations, training the neural network to limit boundary thickness involves training the neural network to perform warping or non-maxima suppression. This can involve training the neural network to identify pixels on either side of boundary pixels in the predicted normal directions, compare the boundary pixels with the identified pixels on either side, and suppressing non-maximum pixels based on the comparisons.

In some implementations, the neural network is trained to output boundaries with sub-pixel precision. This can involve training the neural network to output boundaries with sub-pixel precision by fitting a parabola to intensities of a boundary pixel and pixels on either side of the boundary pixel based on a determined normal direction. The peak of apex of the parabola, which is somewhere within the pixel, may be a more accurate/precise point of the boundary. These points can be determined for each of multiple pixels and connected by a line that more accurately represents the boundaries (e.g., with sub-pixel precision).

At block 1430, the method 1400 integrates the neural network into an application stored on a non-transitory computer-readable medium. For example, the neural network may be saved as part of an application that is executed by a device or accessed from a remote location (e.g., a separate device or server).

Neural networks trained to directly predict thin boundaries according to one or more of the techniques and systems disclosed herein may be used to provide various benefits. In some implementations, an image is obtained and a neural network is used to determine thin boundaries within the image. Such boundaries can be displayed to a user on an electronic device or added to the image, for example, as an overlay. Determined boundaries can be used to detect and identify an object in the image, to perform visual inertial odometry (VIO), to perform simultaneous localization and mapping (SLAM) based on the determined boundaries, to predict collisions, and for numerous other purposes.

Figure 15:
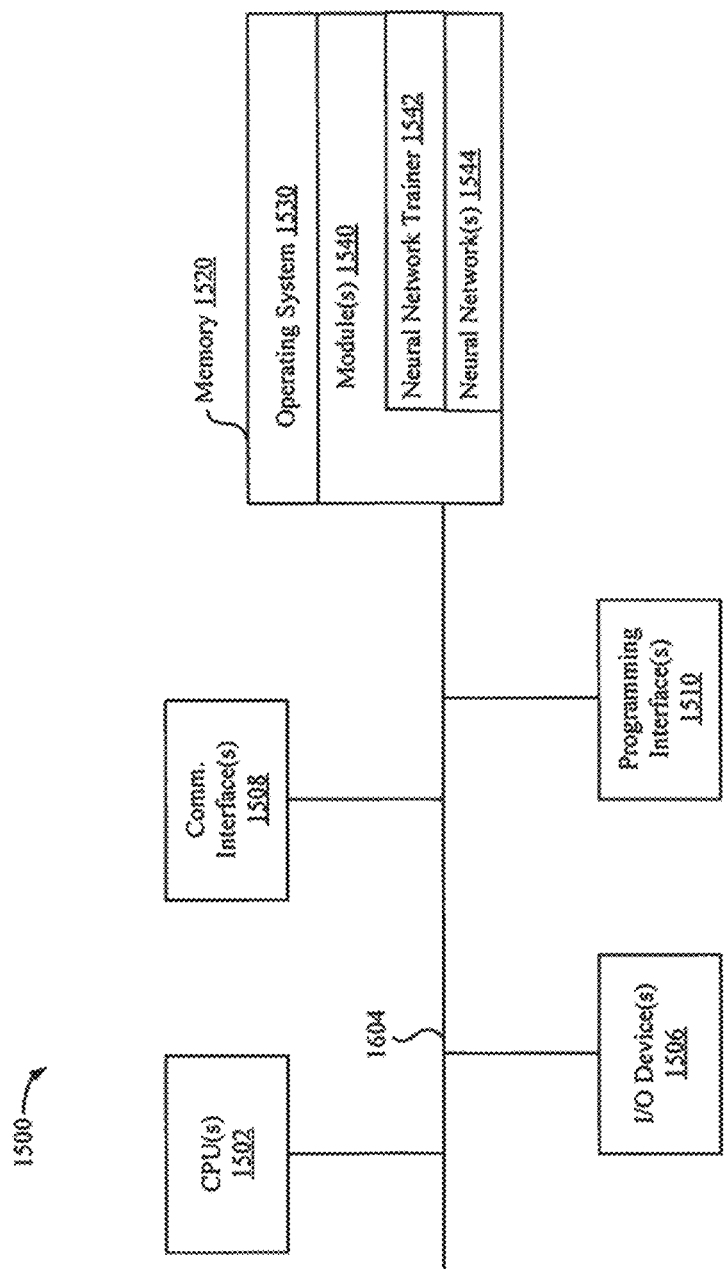
FIG. 15 is a block diagram of an example system architecture of an exemplary device in accordance with some implementations.

FIG. 15 is a block diagram of an example system architecture of an exemplary device configured to train and store a neural network in accordance with one or more implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1500 includes one or more processing units 1502 (e.g., microprocessors, ASICs, FPGAs, GPUs, CPUs, processing cores, or the like), one or more input/output (I/O) devices 1506, one or more communication interfaces 1508 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 1510, a memory 1520, and one or more communication buses 1504 for interconnecting these and various other components.

In some implementations, the one or more communication buses 1504 include circuitry that interconnects and controls communications between system components. In some implementations, the one or more I/O devices 1506 include at least one of a touch screen, a softkey, a keyboard, a virtual keyboard, a button, a knob, a joystick, a switch, a dial, an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more image sensors, one or more microphones, one or more speakers, a haptics engine, one or more depth sensors (e.g., a structured light, a time-of-flight, or the like), one or more displays, or the like.

In some implementations, the one or more displays correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), or the like display types. In some implementations, the one or more displays correspond to diffractive, reflective, polarized, holographic, etc. waveguide displays. In one example, the device 1500 includes a single display or no display.

The memory 1520 includes high-speed random-access memory, such as DRAM, SRAM, DDR RAM, or other random-access solid-state memory devices. In some implementations, the memory 1520 includes non-volatile memory, such as one or more magnetic disk storage devices, optical disk storage devices, flash memory devices, or other non-volatile solid-state storage devices. The memory 1520 optionally includes one or more storage devices remotely located from the one or more processing units 1502. The memory 1520 comprises a non-transitory computer readable storage medium. In some implementations, the memory 1520 or the non-transitory computer readable storage medium of the memory 1520 stores the following programs, modules and data structures, or a subset thereof including an optional operating system 830 and one or more modules 1540. The operating system 1530 includes procedures for handling various basic system services and for performing hardware dependent tasks. The neural network trainer 1542 is an example of a module that can be configured to train a neural network according to the techniques disclosed herein. The neural network 1544 represents a neural network that has been integrated into an application or otherwise trained and then stored in the memory 1520.

FIG. 15 is intended more as a functional description of the various features which are present in a particular implementation as opposed to a structural schematic of the implementations described herein. As recognized by those of ordinary skill in the art, items shown separately could be combined and some items could be separated. The actual number of units and the division of particular functions and how features are allocated among them will vary from one implementation to another and, in some implementations, depends in part on the particular combination of hardware, software, or firmware chosen for a particular implementation.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method, comprising:
    at an electronic device having a processor:
        obtaining training inputs identifying boundaries in ground truth image data;
        training a neural network to determine boundaries in images using the training inputs and a loss function, the neural network trained to determine the boundaries, determine normal directions, and limit boundary thickness based on the normal directions; and
        integrating the neural network into an application stored on a non-transitory computer-readable medium.

2. The method of claim 1, wherein the loss function penalizes boundary inaccuracy by penalizing deviation from a boundary identified in the ground truth image data.

3. The method of claim 2, wherein the deviation from the boundary identified in the ground truth data corresponds to inaccuracy in limiting boundary thickness.

4. The method of claim 3 wherein the inaccuracy in limiting boundary thickness corresponds to inaccuracy in predicting the normal directions.

5. The method of claim 1, wherein training the neural network to limit boundary thickness comprises:
    training the neural network to perform non-maxima suppression; or
    training the neural network to identify pixels on either side of boundary pixels in the predicted normal directions by comparing the boundary pixels with the identified pixels on either side and suppressing non-maximum pixels based on the comparisons.

6. The method of claim 5, wherein the pixels on either side of the boundary pixels are adjacent in the determined normal direction.

7. The method of claim 1, wherein the training inputs comprise images having manually identified boundaries between objects in the images.

8. The method of claim 1, wherein only boundaries are labeled in the training inputs.

9. The method of claim 1 further comprising obtaining an image and determining boundaries within the image using the neural network.

10. The method of claim 9 further comprising displaying the image and the determined boundaries.

11. The method of claim 9 further comprising detecting an object in the image based on the determined boundaries.

12. The method of claim 9 further comprising performing visual inertial odometry (VIO) or simultaneous localization and mapping (SLAM) based on the determined boundaries.

13. The method of claim 9 further comprising predicting a collision based on the determined boundaries.

14. The method of claim 1, wherein the neural network is trained to output boundaries with sub-pixel precision.

15. The method of claim 1, wherein the neural network is trained to output boundaries with sub-pixel precision by fitting a parabola to intensities of a boundary pixel and pixels on either side of the boundary pixel based on a determined normal direction.

16. A system comprising:
    a non-transitory computer-readable storage medium; and
    one or more processors coupled to the non-transitory computer-readable storage medium, wherein the non-transitory computer-readable storage medium comprises program instructions that, when executed on the one or more processors, cause the system to perform operations comprising:
        obtaining training inputs identifying boundaries in ground truth image data;
        training a neural network to determine boundaries in images using the training inputs and a loss function, the neural network trained to determine the boundaries, determine normal directions, and limit boundary thickness based on the normal directions; and
        integrating the neural network into an application stored on a non-transitory computer-readable medium.

17. The system of claim 16, wherein the loss function penalizes boundary inaccuracy by penalizing deviation from a boundary identified in the ground truth image data.

18. The system of claim 17, wherein the deviation from the boundary identified in the ground truth data corresponds to inaccuracy in limiting boundary thickness.

19. The system of claim 18, wherein the inaccuracy in limiting boundary thickness corresponds to inaccuracy in predicting the normal directions.

20. A non-transitory computer-readable storage medium, storing program instructions computer-executable on a computer to perform operations comprising:
    obtaining training inputs identifying boundaries in ground truth image data;
    training a neural network to determine boundaries in images using the training inputs and a loss function, the neural network trained to determine the boundaries, determine normal directions, and limit boundary thickness based on the normal directions; and integrating the neural network into an application stored on a non-transitory computer-readable medium.

* * * * *